No. 850,265. PATENTED APR. 16, 1907.
J. D. SOWER.
SPRING WHEEL.
APPLICATION FILED NOV. 24, 1906.
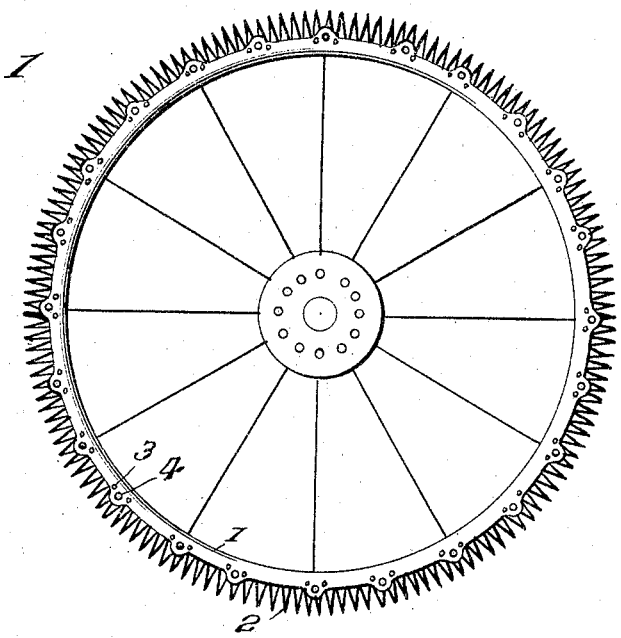
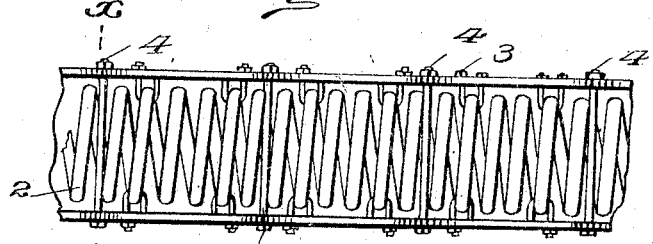
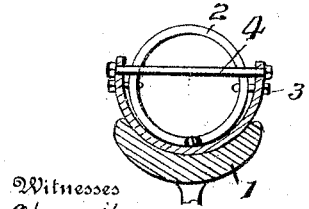
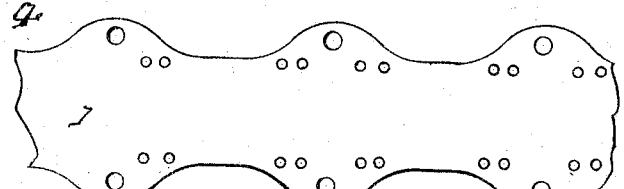

UNITED STATES PATENT OFFICE.

JACOB D. SOWER, OF ELMO, KANSAS.

SPRING-WHEEL.

No. 850,265.  Specification of Letters Patent.  Patented April 16, 1907.

Application filed November 24, 1906. Serial No. 344,970.

*To all whom it may concern:*

Be it known that I, JACOB D. SOWER, a citizen of the United States, residing at Elmo, in the county of Dickinson and State of Kansas, have invented certain new and useful Improvements in Spring-Wheels, of which the following is a specification.

This invention has for its object to provide a novel form of tire for vehicle-wheels, such as automobiles and mechanically-propelled carriages, said tire embodying all the advantages of a pneumatic or cushion tire, but free from the disadvantages of being readily punctured or injured, so as to cause deflation in tires of the pneumatic type or permanent injury to tires of the cushion variety when passing over a sharp obstacle, such as stone or glass.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment is shown in the accompanying drawings, in which—

Figure 1 is a side view of a vehicle-wheel provided with a tire embodying the invention. Fig. 2 is a plan view of a portion of the tire as seen looking from the tread side. Fig. 3 is a cross-section of the tire on the line $x\ x$ of Fig. 2. Fig. 4 is a plan view of a portion of the blank from which the rim of the tire is formed.

Corresponding and like parts are referred to in the following description and indicated in all the views of the drawings by the same reference characters.

The tire comprises a rim 1 and a spring-coil 2, the latter constituting the tread, whereas the rim is channeled and forms a seat for said coil, the latter being secured within the rim, so as to prevent displacement or creeping.

The rim 1 is channeled in its outer side and is approximately of U form in transverse section, and its wings or side portions are scalloped at their edges to provide depressions and elevations in alternation.

While the rim may be constructed of any material, it is preferred to form the same of sheet metal, having its opposite longitudinal edges formed with indentations and the strip being curved upon itself between its longitudinal edges to form the channel or seat in which the spring-coil 2 is fitted. The rim 1 is adapted to be secured to the rim of the vehicle-wheel in any convenient and substantial way.

The spring-coil 2 may be continuous or formed of sections connected in any manner so as to form an effect of continuous coil or yielding tread.

The spring-coil is formed of spring-wire of suitable gage according to the load to be sustained by the tire. The spring-coil is fitted within the channel of the rim 1 and is held in place by fastenings 3 and transverse rods or bars 4, the latter being passed through openings in the elevated portions of the side members of the rim. The transverse rods or bars 4 may be headed at one end and threaded for a short distance at the opposite end to receive nuts, by means of which they are secured to the rim when placed in position. The fastenings 3 consist of hook-bolts which are passed through openings near the upper edges of the side portions of the rim, the hooks of said bolts engaging with elements of the spring-coil, thereby preventing transverse displacement of said spring-coil when subjected to lateral stress, as when the vehicle is making a short curve. The transverse rods or bars 4 engage with elements of the spring-coil and subdivide the latter into sections, thereby preventing circumferential movement of the coil upon the rim or gripping the said coil upon the rim. The outer portion of the spring-coil projects some distance beyond the edges of the side bars of the rim 1 to sustain the load and prevent the edges of the rim from coming in contact with the surface upon which the vehicle may be traveling.

Having thus described the invention, what is claimed as new is—

1. A yieldable tire for vehicle-wheels, the same comprising a channeled rim, a spring-coil seated in the channel thereof, transverse rods, or bars, supported at their ends in the side portions of the rim and engaging with the elements of the spring-coil to prevent circumferential movement thereof, and fasten ing means connecting the portions of the spring-coil between said transverse rods to the side portions of the rim.

2. A yieldable tire comprising a channeled rim having the edges of its side portions indented to form depressions and elevations in alternation, a spring-coil seated in the channel of said rim, transverse rods, or bars, extended across the spring-coil and secured at their ends in openings formed in the elevated portions of the rim, and fastenings connecting side portions of the spring-coil with the depressed edge portions of the rim.

In testimony whereof I affix my signature in presence of two witnesses.

JACOB D. SOWER. [L. S.]

Witnesses:
EDW. J. LORSON,
RICHARD SCHILBERG.